(12) United States Patent
Willert

(10) Patent No.: US 10,765,101 B2
(45) Date of Patent: Sep. 8, 2020

(54) CONTAINER FOR TRAPPING INSECTS AND METHOD OF MAKING SAME

(71) Applicant: Willert Home Products, Inc., Saint Louis, MO (US)

(72) Inventor: Bryan Bruce Willert, Saint Louis, MO (US)

(73) Assignee: Willert Home Products, Inc., Saint Louis, MO (US)

( * ) Notice: Subject to any disclaimer, the term of this patent is extended or adjusted under 35 U.S.C. 154(b) by 396 days.

(21) Appl. No.: 15/784,535

(22) Filed: Oct. 16, 2017

(65) Prior Publication Data

US 2019/0110457 A1   Apr. 18, 2019

(51) Int. Cl.
*A01M 1/02* (2006.01)
*A01M 1/10* (2006.01)

(52) U.S. Cl.
CPC ............. *A01M 1/02* (2013.01); *A01M 1/106* (2013.01)

(58) Field of Classification Search
CPC ........... A01M 1/02; A01M 1/10; A01M 1/106
See application file for complete search history.

(56) References Cited

U.S. PATENT DOCUMENTS

| | | | |
|---|---|---|---|
| 1,623,439 A * | 4/1927 | Rawlings | A01M 1/02 43/107 |
| 4,030,233 A * | 6/1977 | Wunsche | A01M 1/02 43/121 |
| D256,716 S | 9/1980 | Gombert et al. | |
| 4,930,251 A | 6/1990 | Crisanti | |
| 5,548,922 A | 8/1996 | Wefler | |
| 6,532,695 B1 * | 3/2003 | Alvarado | A01M 1/106 43/107 |
| 6,618,983 B1 | 9/2003 | Spragins | |
| 6,625,922 B1 | 9/2003 | Ernsberger, IV | |
| 6,789,352 B2 | 9/2004 | Price et al. | |
| D564,061 S | 3/2008 | Studer et al. | |
| D565,145 S | 3/2008 | Studer et al. | |
| 7,694,456 B1 | 4/2010 | Curtis | |
| D650,464 S | 12/2011 | Swietoslawski | |
| D650,882 S | 12/2011 | Sweitoslawski | |
| D650,883 S | 12/2011 | Swietoslawski | |
| 8,205,378 B2 | 6/2012 | Banfield | |
| D673,642 S | 1/2013 | Robinson | |
| 8,418,399 B2 | 4/2013 | Palancia-Adrubau et al. | |
| 8,793,927 B2 | 8/2014 | Winkler | |
| D714,416 S | 9/2014 | Sehl et al. | |
| D778,398 S | 2/2017 | Leier et al. | |
| D778,399 S | 2/2017 | Leier et al. | |
| D789,481 S | 6/2017 | Rubel | |

(Continued)

FOREIGN PATENT DOCUMENTS

WO   WO-2019172481 A1 *  9/2019  ............. A01M 1/02

*Primary Examiner* — Kristen C Hayes
(74) *Attorney, Agent, or Firm* — Armstrong Teasdale LLP

(57) ABSTRACT

The disclosure provides a container for trapping insects. The container includes a base defining a cavity configured to receive a lure pod, and a lid removably coupled to the base. The base includes at least one base shoulder for supporting a lure pod within the cavity. The lid includes a nozzle including a tube defining a passageway for insects to enter into the cavity. The lid and the base are moveable between an open configuration configured to receive a lure pod and a closed configuration configured to secure the lure pod within the cavity.

20 Claims, 5 Drawing Sheets

(56) References Cited

U.S. PATENT DOCUMENTS

| | | | |
|---|---|---|---|
| 10,178,861 B2* | 1/2019 | Leier | A01M 1/106 |
| 2006/0207163 A1 | 9/2006 | Frokopy | |
| 2008/0196296 A1* | 8/2008 | Studer | A01M 1/02 43/114 |
| 2009/0000180 A1 | 1/2009 | Palencia-Adrubau et al. | |
| 2011/0072710 A1 | 3/2011 | Kuus | |
| 2014/0290123 A1 | 10/2014 | Duff | |
| 2016/0366870 A1* | 12/2016 | Leier | A01M 1/106 |
| 2017/0020119 A1* | 1/2017 | Naden | A01M 1/02 |
| 2017/0273292 A1* | 9/2017 | Leier | A01M 1/106 |

* cited by examiner

CONTAINER FOR TRAPPING INSECTS AND METHOD OF MAKING SAME

BACKGROUND

The subject matter described herein relates generally to an insect trap and, more particularly, to a container for luring and trapping insects and a method of making the same.

It is common for flying insect traps to include a container and a port coupled to the container. The container houses a substance that attracts flying insects to the port, and the port is designed to permit insects to enter the container while inhibiting their exit from the container. Thus, flying insects that enter the container tend to become trapped therein, and ultimately perish inside the container.

At least some known insect traps are configured to house an insect lure within an inner surface of the trap. After a period of time, it may be desirable to dispose of the lure. For example, the lure may be disposed of when the lure is overpopulated with insects or the lure has a diminishing capability of attracting insect (e.g., the scent of the lure is reduced). In another example, the lure may be disposed of when the trap is moved to prevent spills or when the trap is stored for subsequent deployments. With these known insect traps, the lure is typically stored in the traps directly on the inner surfaces of the traps, and thus the traps must be disposed of along with the lure to prevent unwanted orders from the traps and accidentally attracting insects when the traps are not deployed.

BRIEF DESCRIPTION

In one aspect, a container for trapping insects is provided. The container includes a base defining a cavity configured to receive a lure pod, and a lid removably coupled to the base. The base includes at least one base shoulder for supporting a lure pod within the cavity. The lid includes a nozzle including a tube defining a passageway for insects to enter into the cavity. The lid and the base are moveable between an open configuration configured to receive a lure pod and a closed configuration configured to secure the lure pod within the cavity.

In another aspect, system for luring and trapping insects is provided. The system includes a container including a base defining a cavity configured to receive a lure pod wherein the base includes at least one base shoulder for supporting a lure pod within the cavity, and a lid removably coupled to the base wherein the lid including a nozzle including a tube defining a passageway for insects to enter into the cavity. The lid and the base are moveable between an open configuration configured to receive a lure pod and a closed configuration configured to secure the lure pod within the cavity.

In yet another aspect, a method for making a container for luring and trapping insects is provided. The method includes forming a base defining a cavity configured to receive a lure pod wherein the base includes at least one base shoulder for supporting a lure pod within the cavity, and forming a lid removably coupled to the base wherein the lid includes a nozzle comprising a tube defining a passageway for insects to enter into the cavity. The lid and the base are moveable between an open configuration configured to receive a lure pod and a closed configuration configured to secure the lure pod within the cavity.

DETAILED DESCRIPTION

The exemplary embodiments described herein provide a container that is useful for trapping insects, such as, but not limited to, flies and mosquitos, but could also be used against other types of insects and/or animals. More specifically, the container is a trap that is configured to secure a disposable lure pod at least partially filled with an insect lure within an inner cavity of the container. The container includes a lid and a base that are moveable between an open configuration in which the lid is detached from the base and a closed configuration in which the lid is coupled to the base. The lure pod is inserted into the inner cavity when the container is in the open configuration. The lure pod is then secured within the inner cavity defined by the lid and the base when the container is in the closed configuration. The lid includes a nozzle that defines a passageway into the inner cavity. The nozzle is positioned adjacent the lure pod to attract insets within the cavity of the container. The nozzle is configured to permit the insects to access the lure pod within the cavity and inhibit the insects from exiting the container via the nozzle. The container is configured to enable disposal of the lure pod and any trapped insects to enter the lure pod without requiring disposal of the container by moving the container to the open configuration and removing the lure pod. The container may be reused by securing a new lure pod within the container.

Figure 1:
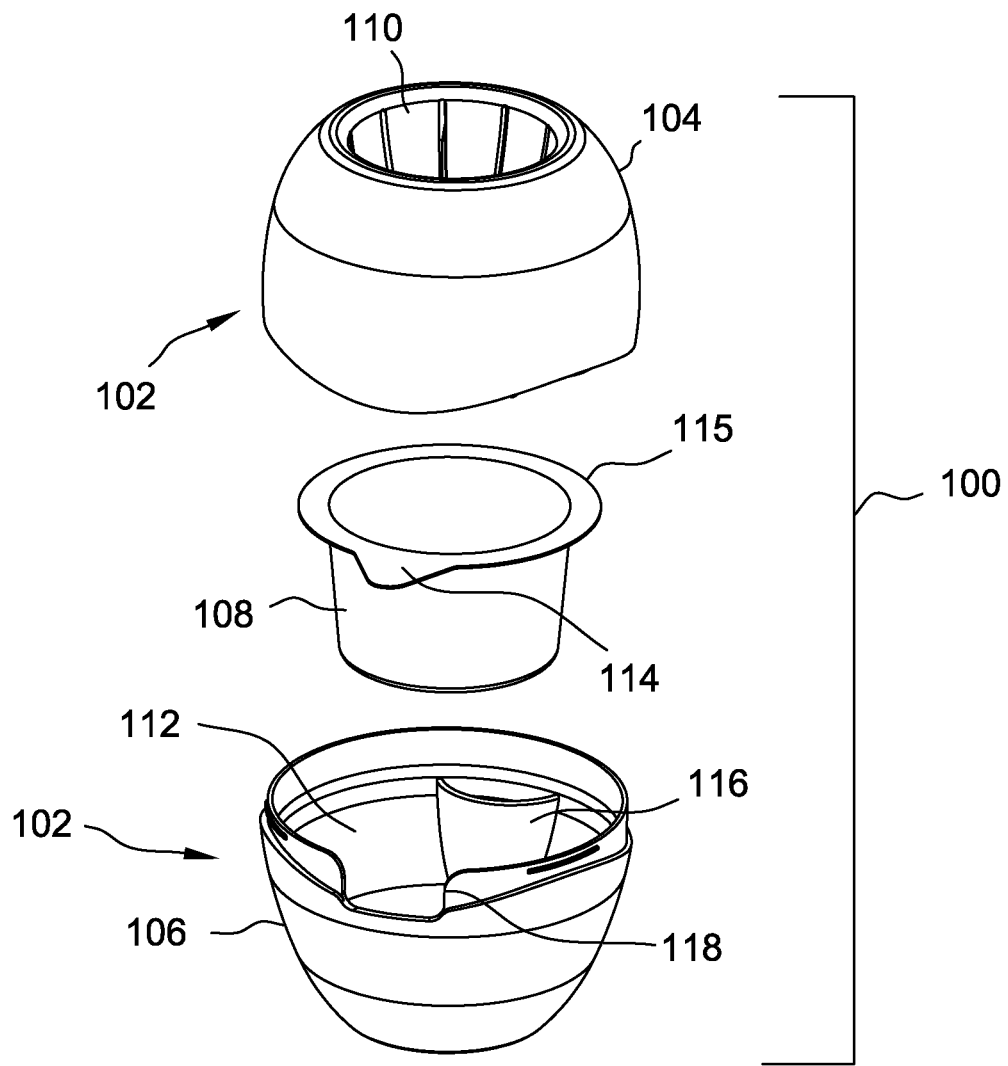
FIG. 1 is an exploded view of a system for trapping an insect.

FIG. 1 is a perspective view of an example embodiment of an insect trapping system 100 including a container 102 for trapping insects. In the example embodiment, container 102 is a two-piece, spherical container including a lid 104, and a base 106. Lid 104 is configured to be removably coupled to base 106. FIG. 1 depicts lid 104 and base 106 in an open configuration. In some embodiments, container 102 is non-spherical shaped. For example, container 102 may be cube shaped, rectangular shaped, or another shape suitable for a container to hold insects. In some embodiments, lid 104 and base 106 are not removably coupled, and are instead integrally formed. Lid 104 includes a nozzle 110 that provides insect access into container 102 as described herein.

System 100 further includes a lure pod 108 secured within base 106 of container 102. Specifically, lure pod 108 is sized to be secured within a base cavity 112 and rest on top of a plurality of base shoulders 116. More specifically, a rim 115 of lure pod 108 is configured to be supported by base shoulders 116. In the example embodiment, lure pod 108 is a separate and disposable container that holds an insect attractant for luring insects into container 102. In some embodiments, lure pod 108 includes an arm 114 for enabling opening of lure pod 108. For example, in the example embodiment, lure pod 108 includes a plastic seal. Lure pod 108 is opened by gripping the plastic seal above arm 114, and peeling off the plastic seal, such that the insect attractant within lure pod 108 is exposed. Insect attractants may include, but are not limited to, insect foods, pheromone lures, or any other mixture suitable for attracting insects.

Figure 2:
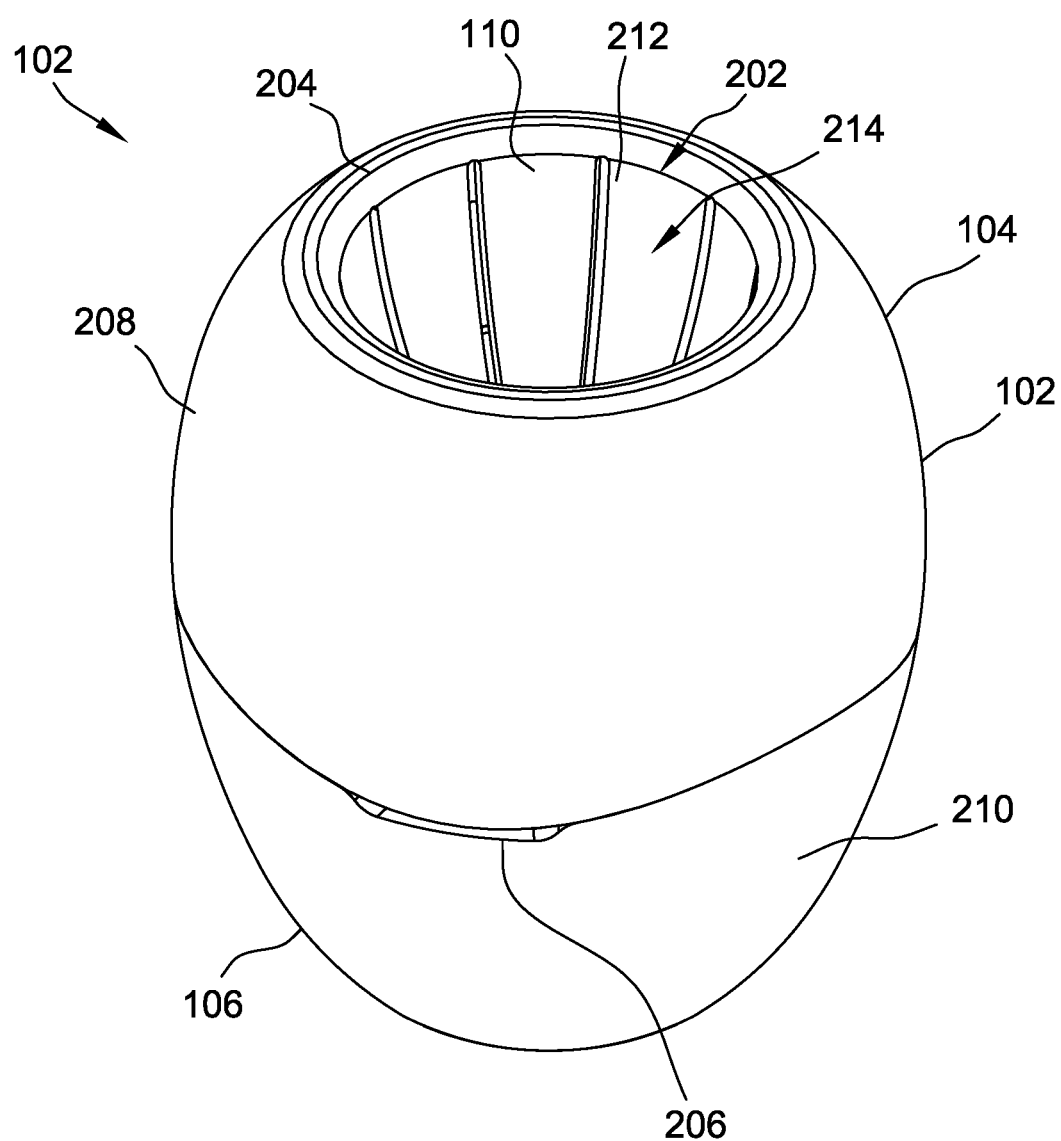
FIG. 2 is a perspective view of an example container used in the system for trapping an insect shown in FIG. 1.

FIG. 2 is a perspective view of an example container 102 used in system 100 for trapping an insect shown in FIG. 1.

As illustrated in FIG. 2, container 102 is in a closed configuration. Specifically, lid 104 is coupled to base 106. In this view, lure pod 108 (not shown in FIG. 2) is not included within container 102. Lid 104 includes a first outer surface 208 that surrounds nozzle 110. Similarly, base 106 includes a second outer surface 210 that surrounds and defines base cavity 112. In the example embodiment, first outer surface 208 and second outer surface 210 are made of a rigid plastic material. In some embodiments, all of lid 104 and base 106 are made of a rigid plastic material. In other embodiments, lid 104 and/or base 106 are made of any other suitable material, such as but not limited to, silicone and/or metal.

Container 102 defines an inlet 202 at a top edge 204 of lid 104, wherein inlet 202 leads to nozzle 110. Nozzle 110 defines a passageway 214 for insects to move from the outside of container 102 to the inside of container 102 through inlet 202. In the example embodiment, nozzle 110 is integrally formed with lid 104.

In the example embodiment, when container 102 is in the closed configuration, container 102 defines a slot 206, as described in detail below. Slot 206 enables arm 114 (shown in FIG. 1) to extend through container 102 while lure pod 108 is secured within base 106.

Figure 3:
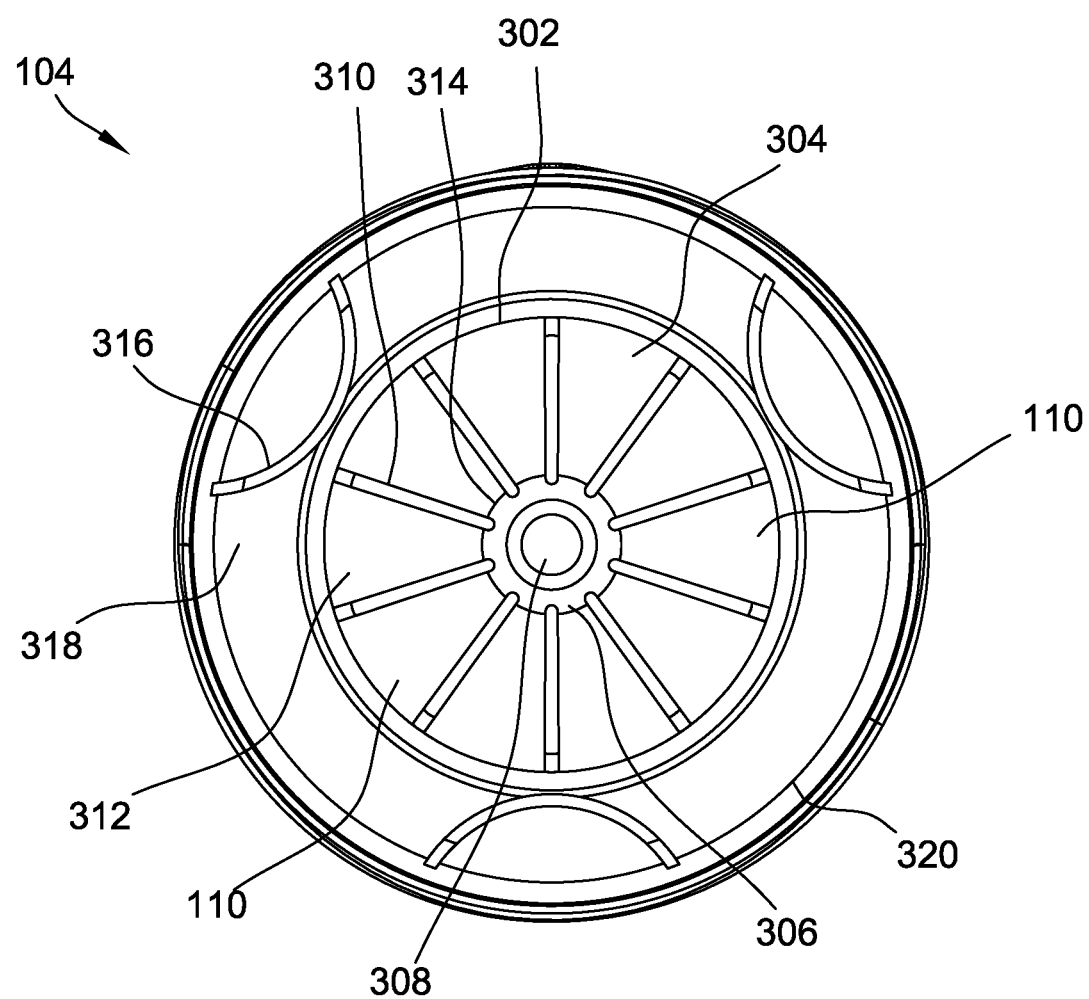
FIG. 3 is a bottom view of a lid used in the system for trapping an insect shown in FIG. 1.

FIG. 3 is a bottom view of lid 104 used in system 100 for trapping an insect shown in FIG. 1. In the example embodiment, nozzle 110 includes a tube 302, a plurality of fingers 304, and a ring member 306. Tube 302 is a tubular surface area that begins from inlet 202 and leads to ring member 306. Tube 302 further defines the passageway 214 that extends from inlet 202 to ring member 306. Ring member 306 is integrally formed with nozzle 110, and defines an outlet 308. Outlet 308 enables passage of insects from inlet 202, through the passageway defined by tube 302, and into container 102 via outlet 308. Outlet 308 is configured to be positioned adjacent the lure pod 108 when container 102 is in the closed configuration and lure pod 108 is secured within container 102 to attract insects.

In the example embodiment, tube 302 includes a plurality of circumferentially spaced fingers 304 that are each spaced apart at a substantially equal distance from one another. Fingers 304 define a plurality of gaps 310 that extend from inlet 202 to outlet 308 and form integrally with a ring member 306. In the example embodiment, tube 302, fingers 304, top edge 204, and ring member 306 are made of are all made from a rigid plastic material and are integrally formed together as a single-piece, unitary structure. In other embodiments, nozzle 110 may be made from any suitable material (e.g., a material other than a rigid plastic), and tube 302, fingers 304, top edge 204, and ring member 306 are not integrally formed together. For example, top edge 204, and ring member 306 may be formed separately from, and coupled to, tube 302 and/or one another using a suitable fastener (e.g., a mechanical fastener or an adhesive fastener). Alternatively, nozzle 110 may not have a plurality of fingers 304 in some embodiments.

Tube 302 has an interior surface 312 and an exterior surface 212 (shown in FIG. 2), each having a substantially annular top-down profile. Inlet 202 has a larger diameter than outlet 308 such that interior surface 312 has a shape that is substantially like an inverted frustum (i.e., interior surface 312 is substantially frustoconical).

In some embodiments, at least part of interior surface 312 and/or exterior surface 212 may not have a substantially annular top-down profile. For example, at least part of interior surface 312 and/or exterior surface 212 may have a substantially square or rectangular top-down profile. In other embodiments, interior surface 312 may not be substantially frustoconical. For example, interior surface 312 may be shaped such that inlet 202 and outlet 308 have substantially the same size and shape (e.g., interior surface 312 may be substantially cylindrical from inlet 202 to outlet 308).

Nozzle 110 is designed to impair the vision of a flying insect (e.g. a fly such as a fruit fly, house fly, a blue bottle fly, a blow fly, or a canyon fly) attempting to container 102 via outlet 308. In the example embodiment, tube 302 impairs the insect's vision by virtue of being perforated, in that nozzle 110 has fingers 304 that converge toward ring member 306. Each finger 304 has a distal end 314, such that distal ends 314 collectively circumscribe and define ring member 306. In some embodiments, tube 302 may be perforated in any suitable manner that facilitates enabling tube 302 to perform a vision-impairing function as described herein. For example, in one embodiment, tube 302 may not be perforated by virtue of having fingers 304 that are spaced apart, but, rather, may instead be perforated by virtue of a mesh-like arrangement of wires (not shown) or beams (not shown). Alternatively, tube 302 may not be designed to perform its vision-impairing function by virtue of its structural configuration, but may instead have an aesthetic (or non-structural) characteristic (e.g., surface texture, color, smell, etc.) that is designed to impair the ability of a flying insect to enter outlet 308 via ring member 306.

Lid 104 further includes at least one lid shoulder 316 coupled to an inner lid surface 318, wherein inner lid surface 318 is a spherical surface area located opposite first outer surface 208. In the example embodiment, lid shoulders 316 are integrally formed with inner lid surface 318. In at least some embodiments, lid shoulders 316 is configured to align with base shoulders 116 to secure lure pod 108 within base cavity 112 when lid 104 and base 106 are in the closed configuration (each shown in FIG. 1).

Figure 4:
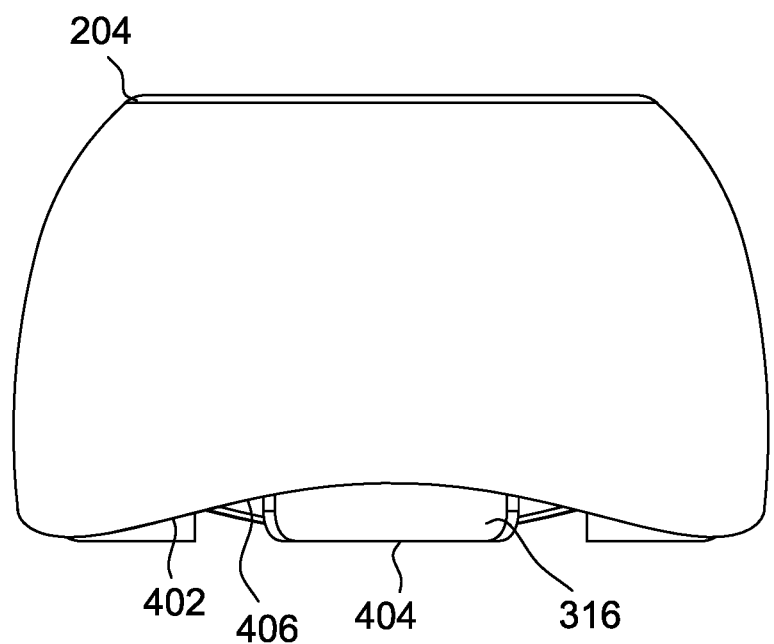
FIG. 4 is a side view of the lid used in the system for trapping insects shown in FIG. 2.

FIG. 4 is a side view of the lid used in the system for trapping insects shown in FIG. 2. In the example embodiment, lid 104 further includes an outer lip 402 opposite top edge 204, wherein outer lip 402 includes a second curved edge 406. Outer lip 402 is configured to facilitate alignment for coupling of lid 104 to base 106 as described herein. As described in FIG. 3, at least one lid shoulder 316 extends outward from inner lid surface 318, and downward from top edge 204 towards outer lip 402. In the example embodiment, a lid shoulder edge 404 located on each of the lid shoulders 316 extends downward past outer lip 402. Lid shoulder edge 404 is configured to engage rim 115 of lure pod 108 (shown in FIG. 1) to secure lure pod 108.

Figure 5:
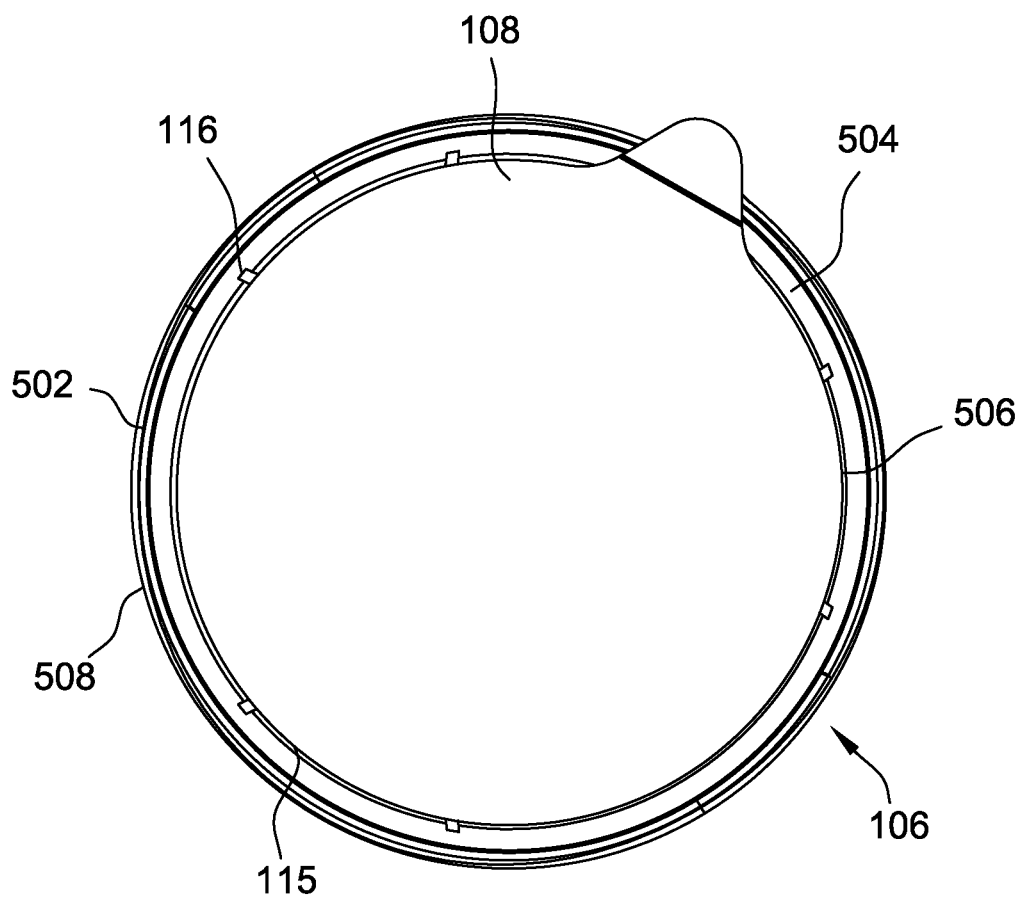
FIG. 5 is a top view of a pod secured within a base used in the system for trapping an insect shown in FIG. 1.

FIG. 5 is a top view of lure pod 108 secured within base 106 used in system 100 for trapping an insect shown in FIG. 1. Base 106 further includes a groove 502 having a first curved edge 508, wherein groove 502 and base outer surface 602 define ridge 118 (shown in FIG. 1). When in the closed configuration, as shown in FIG. 2, slot 206 is formed and defined by outer lip 402 and ridge 118. As described above, slot 206 enables arm 114 of lure pod 108 to extend through base 106 and container 102, limiting rotation of lure pod 108 to reduce spills of insect attractant.

Base shoulders 116 (also shown in FIG. 1) are integrally formed with a base inner surface 504, wherein base inner surface 504 is located opposite of second outer surface 210 and defines base cavity 112. Base shoulders 116 extend inwardly toward base cavity 116 and away from base inner surface 504, and further extend upward vertically toward groove 502. In the example embodiment, lure pod 108 includes rim 115 which defines a perimeter of lure pod 108.

Lure pod edge 506 is sized to fit on top of base shoulders 116 when lure pod 108 is dropped onto or secured within base 106.

Referring back to FIG. 1, in the example embodiment, groove 502 includes at least one lock member 120. Lock member 120 fits within a key groove 320 (shown in FIG. 3) located on lid 104, enabling snap fit coupling between lid 104 and base 106. Specifically, key groove 320 is located on inner lid surface 318 near outer lip 402, and receives lock member 120 when container 102 is in the closed configuration. For example, when assembling container 102, a user may align and couple groove 502 with outer lip 402. When aligned, lock member 120 removably snap fits into the key groove enabling the coupling of lid 104 and base 106.

To assemble and deploy system 100, lure pod 108, containing an insect attractant for an insect (e.g., a fruit fly) is dropped or placed within base cavity 112 of base 106. As described above, lure pod edge 506 is positioned on top of base shoulders 116. The attractant is activated by peeling of the seal off of lure pod 108 before it is placed in base cavity 112. In embodiments where the insect attractant is a dry powder, water may be poured in lure pod 108 to activate the insect attractant. Lure pod 108 is configured to hold an insect lure, including but not limited to, a sugar based mixture. It should be understood that lure pod 108 may hold any suitable type of insect lure or insect attractant. In the example embodiment, lure pod 108 is a disposable container. For example, lure pod 108 may have a removable plastic seal, and may be disposed of after sufficient use. In other embodiments, lure pod 108 is not disposable, and may be removed, refilled, and reinserted into base 106. It should be understood that different sized lure pods 108 may be used with different sized containers 102, as should not be limited to the size as illustrated in the disclosure. Lid 104 is then aligned and positioned with base 106, such that groove 502 and outer lip 402 are aligned. Specifically, the first curved edge of outer lip 402 and the second curved edge of groove 502 are configured to be aligned to couple base 106 and lid 104 together in the closed configuration. In this manner, container 102 can stand upright on a support surface (not shown) (e.g., the ground or a table near a garbage can, a compost pile, an animal stable, or anywhere else where the trapping of insects is desired).

Because air can enter and exit nozzle 110 of container 102, the lure in lure pod 108 attracts insects to nozzle 110, through which insects enter base cavity 112 through passageway 214 of container 102. Due to the configuration of tube 302 (i.e., due to the visual pattern formed by fingers 304), insects that enter container 102 through nozzle 110 have difficulty exiting container 102 through nozzle 110. More specifically, once an insect enters base cavity 112 via outlet 308, the insect has difficulty visually locating outlet 308 and reentering the passageway 214 of nozzle 110 from base cavity 112. Thus, insects that enter base cavity 112 of container 102 tend to remain trapped inside container 102 until they perish, at which point the insects submerge into the liquid located within lure pod 108 such that the liquid mitigates the associated scent (container 102 can be disposed of as desired, and replaced with a new container 102 that is deployable as set forth above. For example, lure pod 108 is full of insects and/or container 102 is being transported or stored).

The exemplary embodiments described herein further provide a method making a container for luring and trapping insects. The method includes forming a base defining a cavity configured to receive a lure pod. The base includes at least one base shoulder for supporting a lure pod within the cavity.

The method further includes forming a lid removably coupled to the base. The lid includes a nozzle comprising a tube defining a passageway for insects to enter into the cavity. The lid and the base are moveable between an open configuration configured to receive a lure pod and a closed configuration configured to secure the lure pod within the cavity.

The methods and systems described herein facilitate providing a container for trapping insects. More specifically, the methods and systems facilitate providing a container that lures flying insects into the container via a nozzle, wherein the nozzle is constructed to inhibit the insects from exiting the container via the nozzle. The methods and systems also facilitate providing a container that is constructed to stand upright on a support surface.

Exemplary embodiments of an insect trap container are described above in detail. The container described herein is not limited to the specific embodiments described herein, but rather, components of the trap may be utilized independently and separately from one another. For example, the container described herein may have other applications not limited to practice in trapping insects, as described herein. Rather, the container described herein can be implemented and utilized in connection with trapping other types of animals.

This written description uses example embodiments, while disclosing the best mode and enabling any person skilled in the art to practice the example embodiments, including making and using any devices or systems and performing any incorporated methods. The patentable scope of this disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A container for trapping insects, the container comprising:
   a base defining a cavity configured to receive a lure pod, wherein the base comprises at least one base shoulder for supporting the lure pod within the cavity; and
   a lid removably coupled to the base, the lid comprising a nozzle comprising a tube defining a passageway for insects to enter into the cavity, the tube comprising a plurality of fingers spaced apart from one another, and wherein the lid and the base are moveable between an open configuration configured to receive the lure pod and a closed configuration configured to secure the lure pod within the cavity.

2. The container according to claim 1, wherein the tube defines an inlet and an outlet such that the passageway is defined therebetween, wherein the outlet is configured to be positioned adjacent the lure pod when the container is in the closed configuration and the lure pod is positioned within the cavity.

3. The container according to claim 2, wherein the inlet has a larger diameter than the outlet.

4. The container according to claim 1, wherein the base further comprises a groove having a first curved edge.

5. The container according to claim 4, wherein the lid further comprises an outer lip having a second curved edge, wherein the first curved edge and the second curved edge are configured to be aligned to couple the base and the lid together in the closed configuration.

6. The container according to claim 5, wherein the groove defines a ridge, wherein the ridge and the second curved edge define a slot while in the closed configuration.

7. The container according to claim 6, wherein the groove includes a lock member, wherein the lock member fits within a key groove located on the outer lip when in the closed configuration.

8. A system for luring and trapping insects comprising:
a lure pod; and
a container comprising:
a base defining a cavity configured to receive the lure pod, wherein the base comprises at least one base shoulder for supporting the lure pod within the cavity; and
a lid removably coupled to the base, the lid comprising a nozzle comprising a tube defining a passageway for insects to enter into the cavity, the tube comprising a plurality of fingers spaced apart from one another, wherein the lid and the base are moveable between an open configuration configured to receive the lure pod and a closed configuration configured to secure the lure pod within the cavity.

9. The system according to claim 8, wherein the tube defines an inlet and an outlet such that the passageway is defined therebetween, wherein the outlet is configured to be positioned adjacent the lure pod when the container is in the closed configuration and the lure pod is positioned within the cavity.

10. The system according to claim 9, wherein the inlet has a larger diameter than the outlet.

11. The system according to claim 8, wherein the base further comprises a groove having a first curved edge.

12. The system according to claim 11, wherein the lid further comprises an outer lip having a second curved edge, wherein the first curved edge and the second curved edge are configured to be aligned to couple the base and the lid together in the closed configuration.

13. The system according to claim 12, wherein the groove defines a ridge, wherein the ridge and the second curved edge define a slot while in the closed configuration.

14. The system according to claim 13, wherein the groove includes a lock member, wherein the lock member fits within a key groove located on the outer lip when in the closed configuration.

15. The system according to claim 8, wherein the lure pod is configured to hold an insect attractant.

16. The system according to claim 8, wherein the lure pod is a disposable container.

17. A container for trapping insects, the container comprising:
a base defining a cavity configured to receive a lure pod, wherein the base comprises at least one base shoulder for supporting the lure pod within the cavity, the base further comprising a groove having a first curved edge; and
a lid removably coupled to the base, the lid comprising a nozzle comprising a tube defining a passageway for insects to enter into the cavity, and
wherein the lid and the base are moveable between an open configuration configured to receive the lure pod and a closed configuration configured to secure the lure pod within the cavity.

18. The container according to claim 17, wherein the tube defines an inlet and an outlet such that the passageway is defined therebetween, wherein the outlet is configured to be positioned adjacent the lure pod when the container is in the closed configuration and the lure pod is positioned within the cavity.

19. The container according to claim 18, wherein the inlet has a larger diameter than the outlet.

20. The container according to claim 17, wherein the lid further comprises an outer lip having a second curved edge, wherein the first curved edge and the second curved edge are configured to be aligned to couple the base and the lid together in the closed configuration.

* * * * *